United States Patent
Fuchs

(10) Patent No.: US 9,457,489 B2
(45) Date of Patent: Oct. 4, 2016

(54) MACHINE TOOL SYSTEM

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 170 days.

(21) Appl. No.: 14/002,747

(22) PCT Filed: Mar. 2, 2012

(86) PCT No.: PCT/EP2012/000918
§ 371 (c)(1),
(2), (4) Date: Nov. 13, 2013

(87) PCT Pub. No.: WO2012/116829
PCT Pub. Date: Sep. 7, 2012

(65) Prior Publication Data
US 2014/0053418 A1    Feb. 27, 2014

(30) Foreign Application Priority Data
Mar. 3, 2011   (DE) .................. 10 2011 005 039

(51) Int. Cl.
*B27B 17/02* (2006.01)
*B23D 57/02* (2006.01)
*B27B 17/00* (2006.01)

(52) U.S. Cl.
CPC ......... *B27B 17/0083* (2013.01); *B23D 57/023* (2013.01); *B27B 17/02* (2013.01)

(58) Field of Classification Search
CPC .......... B27B 17/0016; B27B 17/0083; B27B 17/02; B23D 57/0076; B23D 57/02
USPC .............. 30/122, 381–383, 123.4, 390–391; 83/750
See application file for complete search history.

(56) References Cited

U.S. PATENT DOCUMENTS

| | | | | |
|---|---|---|---|---|
| 2,860,671 A | * | 11/1958 | Wilder | 30/122 |
| 3,425,104 A | * | 2/1969 | Mochizuki | A44B 11/12 24/265 WS |
| 3,864,830 A | * | 2/1975 | Haddon | B23Q 9/0021 30/371 |
| 4,033,035 A | * | 7/1977 | Trimmer | 30/122 |
| 4,048,722 A | * | 9/1977 | Howard | 30/386 |
| 4,270,270 A | * | 6/1981 | Loyd | 30/122 |
| 4,382,334 A | | 5/1983 | Reynolds | |

(Continued)

FOREIGN PATENT DOCUMENTS

| | | |
|---|---|---|
| CN | 101745693 A | 6/2010 |
| DE | 41 24 234 A1 | 1/1993 |

(Continued)

OTHER PUBLICATIONS

International Search Report corresponding to PCT Application No. PCT/EP2012/000918, mailed Jul. 9, 2012 (German and English language document) (7 pages).

*Primary Examiner* — Laura M Lee
(74) *Attorney, Agent, or Firm* — Maginot, Moore & Beck LLP

(57) ABSTRACT

A machine tool system comprises at least one machine tool separating device, which has at least one cutting strand and at least one guide unit for guiding the cutting strand, which together form a self-contained system, and at least one portable machine tool, which comprises a machine tool housing and at least one coupling device for coupling the machine tool separating device. The portable machine tool comprises at least one pad unit to be placed on a workpiece, wherein the pad unit and the machine tool housing are mounted such that they can be moved relative to each other.

12 Claims, 3 Drawing Sheets

(56) References Cited

U.S. PATENT DOCUMENTS

| | | | | |
|---|---|---|---|---|
| 4,611,521 | A | * | 9/1986 | McCardle ................... 83/796 |
| 4,649,644 | A | * | 3/1987 | Huddleston ................. 30/122 |
| 4,727,889 | A | * | 3/1988 | Niven et al. ................ 131/297 |
| 4,821,415 | A | * | 4/1989 | Kress .......................... 30/122 |
| 4,858,318 | A | * | 8/1989 | Anderson .................... 30/122 |
| 4,945,637 | A | * | 8/1990 | Anderson .................... 30/122 |
| 5,077,896 | A | * | 1/1992 | Rivera ......................... 30/122 |
| 5,088,197 | A | * | 2/1992 | Anderson .................... 30/122 |
| 5,239,758 | A | * | 8/1993 | Lindell ............. B23D 57/0076 30/122 |
| 5,875,826 | A | * | 3/1999 | Giousos ................... 144/136.95 |
| 6,038,775 | A | * | 3/2000 | Holladay ............ B23Q 9/0028 30/376 |
| 6,408,730 | B1 | * | 6/2002 | Tinner et al. ................. 83/832 |
| 7,055,250 | B2 | * | 6/2006 | Allemann et al. ........... 30/377 |
| 7,281,332 | B2 | * | 10/2007 | Niwa et al. .................. 30/376 |
| 2008/0196257 | A1 | * | 8/2008 | Eller ............................. 30/514 |
| 2011/0247222 | A1 | * | 10/2011 | Fischer ................... B27B 9/02 30/376 |

FOREIGN PATENT DOCUMENTS

| | | |
|---|---|---|
| DE | 195 31 450 A1 | 2/1997 |
| DE | 10 2006 062 001 A1 | 3/2008 |
| EP | 1 083 031 A2 | 3/2001 |
| EP | 1 607 198 A1 | 12/2005 |
| WO | 93/01922 A1 | 2/1993 |

* cited by examiner

MACHINE TOOL SYSTEM

This application is a 35 U.S.C. §371 National Stage Application of PCT/EP2012/000918, filed on Mar. 2, 2012, which claims the benefit of priority to Serial No. DE 10 2011 005 039.6, filed on Mar. 3, 2011 in Germany, the disclosures of which are incorporated herein by reference in their entirety.

BACKGROUND

Machine-tool systems are already known which comprise a machine-tool parting device and a portable machine tool which has a machine-tool housing and a coupling device for the coupling of the machine-tool parting device. Here, the machine-tool parting device has a cutting strand and a guide unit for guiding the cutting strand, which cutting strand and guide unit together form a self-contained system.

SUMMARY

The disclosure is based on a machine-tool system having at least one machine-tool parting device which has at least one cutting strand and at least one guide unit for guiding the cutting strand, which cutting strand and guide unit together form a self-contained system, and having at least one portable machine tool which has a machine-tool housing and at least one coupling device for the coupling of the machine-tool parting device.

It is proposed that the portable machine tool comprises at least one support unit for support on a workpiece, wherein the support unit and the machine-tool housing are mounted so as to be movable relative to one another. A pivot axis about which the support unit is mounted relative to the machine-tool housing preferably runs at least substantially perpendicular to a drive unit longitudinal axis. It is however also conceivable for the support unit to be pivotably mounted relative to the machine-tool housing about some other pivot axis which would appear expedient to a person skilled in the art. Here, a "portable machine tool" should be understood in particular to mean a machine tool, in particular a handheld machine tool, which can be transported by an operator without the use of a transport machine. In particular, the portable machine tool has a mass of less than 40 kg, preferably less than 10 kg and particularly preferably less than 5 kg. The portable machine tool is particularly preferably in the form of an electrically operable plunge-cut saw. The portable machine tool is preferably supplied with energy for the operation of a drive unit of the portable machine tool by means of a battery pack. It is however also conceivable for the portable machine tool to be supplied with energy via a cable which can be connected to a local energy grid.

Here, a "coupling device" should be understood in particular to mean a device which is provided for operatively connecting the machine-tool parting device to the portable machine tool, for the purpose of machining a workpiece, by means of a positively locking and/or non-positively locking connection. In particular, when the coupling device is in a state in which it is coupled to the machine-tool parting device, and when the portable machine tool is in an operating state, forces and/or torques can be transmitted from a drive unit of the portable machine tool to the drive of the cutting strand on the machine-tool parting device. Thus the coupling device is preferably formed as a tool receptacle. The expression "provided for" is intended in this case in particular to mean specially configured and/or specially equipped. The expression "drive unit" is intended in this case to define in particular a unit which is provided for generating forces and/or torques for driving the cutting strand. For the generation of forces and/or torques, it is preferable for thermal energy, chemical energy and/or electrical energy to be converted into kinetic energy by means of the drive unit. In particular, the drive unit is designed such that it can be coupled directly and/or indirectly to the cutting strand. The drive unit particularly preferably comprises at least one rotor, which has at least one armature shaft, and at least one stator. The drive unit is preferably in the form of an electric motor unit. It is however also conceivable for the drive unit to have some other configuration that would appear expedient to a person skilled in the art.

Here, a "cutting strand" should be understood in particular to mean a unit which is provided for locally eliminating the atomic cohesion of a workpiece to be machined, in particular by means of a mechanical parting-off process and/or by means of a mechanical removal of material particles of the workpiece. The cutting strand is preferably provided for separating the workpiece into at least two physically separate parts and/or for at least partially parting off and/or removing material particles of the workpiece proceeding from a surface of the workpiece. The cutting strand is particularly preferably moved in a circulating manner, in particular along a circumference of the guide unit, in at least one operating state. Here, a "guide unit" should be understood in particular to mean a unit which is provided for exerting on the cutting strand a constraining force at least along a direction perpendicular to a cutting direction of the cutting strand in order to predefine a movement capability of the cutting strand along the cutting direction. The guide unit preferably has at least one guide element, in particular a guide groove, through which the cutting strand is guided. As viewed in a cutting plane, the cutting strand is preferably guided through the guide unit along a full circumference of the guide unit by means of the guide element, in particular the guide groove. The guide unit is preferably in the form of a sword. Here, the expression "sword" is intended in particular to define a geometric shape which, as viewed in the cutting plane, has a closed outer contour which comprises at least two mutually parallel straight edges and at least two connecting portions, in particular circular arcs, which each connect facing ends of the straight edges to one another. Thus the guide unit has a geometric shape which, as viewed in the cutting plane, is composed of a rectangle and at least two circular sectors arranged at opposite sides of the rectangle.

Here, the expression "cutting plane" is intended in particular to define a plane in which the cutting strand, in at least one operating state, is moved relative to the guide unit along a circumference of the guide unit in at least two mutually oppositely directed cutting directions. It is preferable if, during the machining of a workpiece, the cutting plane is oriented at least substantially perpendicular to a workpiece surface to be machined. Here, the expression "at least substantially perpendicular" should be understood in particular to mean an orientation of a plane and/or of a direction relative to a further plane and/or a further direction which preferably deviates from a parallel orientation of the plane and/or of the direction relative to the further plane and/or the further direction. It is however also conceivable that, during the machining of a workpiece, the cutting plane is oriented at least substantially parallel to a workpiece surface being machined, in particular in the case of the cutting strand being in the form of a grinding means etc. Here, the expression "at least substantially parallel" should be understood in particular to mean an orientation of a direction relative to a reference direction, in particular in a plane, wherein the direction has a deviation of in particular less than 8°, advantageously less than 5° and particularly advantageously less than 2° with respect to the reference direction. Here, a "cutting direction" should be understood in particular to mean a direction along which, in at least one operating state, owing to a drive force and/or a drive torque, the cutting strand is moved, in particular in the guide unit, in order to generate a cutting gap and/or in order to part off and/or remove material particles of a workpiece to be machined. It is preferable if, in an operating state, the cutting strand is moved relative to the guide unit along the cutting direction.

The cutting strand and the guide unit preferably together form a self-contained system. Here, the expression "self-contained system" is intended in particular to define a system which comprises at least two components, which components maintain functionality by way of interaction in a state in which the system is dismounted from a system superordinate to the system, such as for example a machine tool, and/or which components are captively connected to one another in the dismounted state. The at least two components of the self-contained system are preferably connected to one another at least substantially non-detachably for an operator. Here, the expression "at least substantially non-detachably" should be understood in particular to mean a connection of at least two components which can be severed only with the aid of parting tools, such as for example a saw, in particular a mechanical saw etc., and/or chemical parting means such as for example solvents etc. Here, a "support unit" should be understood in particular to mean a unit which is supported on the workpiece, in particular by way of the support surface of the support unit, during the machining of a workpiece by means of the portable machine tool and when the portable machine tool is being handled correctly, and which is provided for supporting the portable machine tool on the workpiece during the machining of the workpiece. The support unit is particularly preferably in the form of a sliding shoe and/or a base plate. The portable machine tool preferably slides on a surface of the workpiece to be machined by way of the support unit, in particular by way of the support surface of the support unit, during the machining of the workpiece. Here, the expression "movably mounted" is intended in particular to define a mounting of the support unit on the portable machine tool, wherein the support unit, in particular in a manner decoupled by an elastic deformation of the support unit, has a movement capability along at least an extent greater than 1 mm, preferably greater than 10 mm and particularly preferably greater than 50 mm, and/or a movement capability about at least one axis through an angle of greater than 10°, preferably greater than 45° and particularly preferably greater than 60°. By means of the configuration of the portable machine tool according to the disclosure, it is advantageously possible, for example, for a plunge cut to be formed into a workpiece to be machined by means of a machine-tool parting device coupled to the coupling device.

It is also proposed that the support unit comprises at least one bearing element for pivotable mounting, which bearing element, when the support unit is in a mounted state, is operatively connected to the machine-tool housing on a side, which is remote from the coupling device, of the machine-tool housing. The support unit is particularly preferably articulatedly connected to the machine-tool housing by means of the bearing element. The bearing element is particularly preferably in the form of an eyelet with a recess which, in a mounted state, operatively interacts with a journal-like connecting element of the machine-tool housing for the purpose of articulatedly connecting the support unit to the machine-tool housing. It is preferable if, in a mounted state, the journal-like connecting element engages into the recess of the eyelet and thus connects the support unit to the machine-tool housing in an articulated manner. The support unit particularly preferably has at least two bearing elements in the form of eyelets with recesses, said bearing elements being operatively connected to a journal-like connecting element of the machine-tool housing. It is however also conceivable for the bearing element to have some other configuration and/or arrangement that would appear expedient to a person skilled in the art. A movable mounting of the support unit relative to the machine-tool housing can be attained in a structurally simple manner.

The support unit advantageously has at least one spring element which is provided for preloading the support unit and the machine-tool housing relative to one another. A "spring element" should be understood in particular to mean a macroscopic element which has at least an extent which, in a normal operating state, can be elastically varied by at least 10%, in particular by at least 20%, preferably by at least 30% and particularly advantageously by at least 50%, and which in particular generates a counterforce which is dependent on a variation of the extent and which is preferably proportional to the variation and which counteracts the variation. A "macroscopic element" should be understood in particular to mean an element with an extent of at least 1 mm, in particular of at least 5 mm, and preferably of at least 10 mm. The spring element is particularly preferably in the form of a leg spring. The leg spring is preferably supported with one end on the machine-tool housing, and, with a further end of the leg spring, the leg spring is supported on the support unit so as to preload the support unit relative to the machine-tool housing. It is however also conceivable for the spring element to have some other configuration and/or arrangement that would appear expedient to a person skilled in the art. By means of a spring force of the spring element, it is advantageously possible to attain a preload of the support unit relative to the machine-tool housing. Furthermore, by means of the spring force of the spring element, it is advantageously possible in a reliable manner to achieve that the support unit and the machine-tool housing attain and/or maintain a predefined relative initial position between them when an actuation force by an operator, for example, is withdrawn.

It is also proposed that the support unit comprises at least one arresting device which is provided for fixing the machine-tool housing in an angular position relative to the support unit. The arresting unit is particularly preferably provided for fixing the machine-tool housing in a desired angular position relative to the support unit by means of a positive locking element and/or a non-positive locking element of the arresting unit. A cutting depth adjustment can be realized in a particularly advantageous and structurally simple manner.

The arresting device is preferably arranged on a side, which faces toward the machine-tool housing, of the support unit. The support unit particularly preferably has a recess through which the machine-tool parting device, in a state coupled to the coupling device, extends at least in an operating state in order to permit machining of a workpiece to be machined. The arresting device is preferably provided such that, in at least one operating state, in order to fix the machine-tool housing in an angular position relative to the support unit, said arresting device exerts an arresting force on the guide unit of the machine-tool parting device which is coupled to the coupling device. It is however also conceivable for the arresting device, in order to fix the machine-tool housing in an angular position relative to the support unit, to exert an arresting force on some other component that would appear expedient to a person skilled in the art. It is advantageously possible for an arresting force of the arresting unit to be exerted on the guide unit in order to fix the machine-tool housing in an angular position relative to the support unit. Furthermore, a compact arrangement of the arresting unit on the support unit can advantageously be attained.

It is also proposed that the coupling device is pivotably mounted at least relative to the machine-tool housing. The coupling device is preferably pivotably mounted relative to the machine-tool housing about a pivot axis which runs at least substantially perpendicular to the cutting plane of the cutting strand. It is however also conceivable for the coupling device to alternatively or additionally be pivotably mounted relative to the machine-tool housing about some other pivot axis that would appear expedient to a person skilled in the art. It is advantageously possible, in the event of pivoting movements of the support unit relative to the machine-tool housing, to ensure an at least substantially permanent, at least substantially perpendicular orientation of a longitudinal axis of the guide unit relative to a support surface of the support unit when the machine-tool parting device is in a state coupled to the coupling device. It is thus advantageously possible to realize reliable and precise machining of a workpiece with the support unit in different angular positions relative to the machine-tool housing.

The support unit advantageously has at least one tool guide unit which is provided for aligning a longitudinal axis of the machine-tool parting device at least substantially perpendicular to a support surface of the support unit as a function of an angular position of the machine-tool housing relative to the support unit. It is advantageously possible for a position of the machine-tool parting device coupled to the coupling device to be adapted to an angular position of the support unit relative to the machine-tool housing.

The disclosure is also based on a machine-tool parting device for a portable machine tool according to the disclosure. The machine-tool parting device has a cutting strand and a guide unit for guiding the cutting strand. It is advantageously possible to realize a versatile tool for machining workpieces.

The machine-tool parting device advantageously has at least one torque transmission element which is mounted at least partially in the guide unit. The torque transmission element is preferably at least partially surrounded, along at least one direction, by outer walls of the guide unit. The torque transmission element preferably has a concentric coupling recess into which a pinion of a drive unit of a portable machine tool and/or a gearwheel and/or a toothed shaft of a gearing unit of the portable machine tool can engage in a mounted state. Here, the coupling recess is preferably formed by a hexagonal socket. It is however also conceivable for the coupling recess to be of some other configuration that would appear expedient to a person skilled in the art. By means of the configuration of the machine-tool parting device according to the disclosure, it is possible in a structurally simple manner to attain a self-contained system which can, by an operator, be mounted on a machine tool provided for the purpose in a comfortable manner. It is thus advantageously possible to dispense with the need for the operator to individually mount components, such as for example the cutting strand, the guide unit and the torque transmission element, in order to be able to use the machine-tool parting device according to the disclosure.

The disclosure is also based on a portable machine tool for a machine-tool system according to the disclosure. It is advantageously possible to attain a high level of operating comfort for an operator of the portable machine tool.

Here, it is not the intention for the machine-tool parting device according to the disclosure and/or the machine tool according to the disclosure to be restricted to the usage and embodiment described above. In particular, the machine-tool parting device according to the disclosure and/or the machine tool according to the disclosure may, in order to attain functionality described herein, have a number of individual elements, components and units which differs from the number stated herein.

BRIEF DESCRIPTION OF THE DRAWINGS

Further advantages will emerge from the following description of the drawings. The drawings illustrate an exemplary embodiment of the disclosure. The drawings, the description and claims contain numerous features in combination. A person skilled in the art will expediently also consider the features individually and combine them to form further meaningful combinations.

In the drawings.

DETAILED DESCRIPTION

Figure 1:
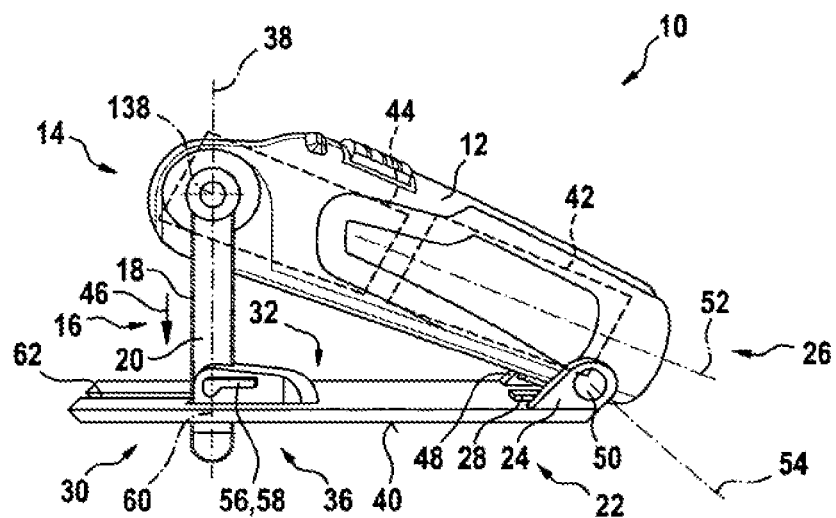
FIG. 1 shows a portable machine tool according to the disclosure, having a machine-tool parting device according to the disclosure, in a schematic illustration.

FIG. 1 shows a portable machine tool 10 having a machine-tool parting device 16, which machine tool and machine-tool parting device together form a machine-tool system. The portable machine tool 10 has a coupling device 14 for positively locking and/or non-positively locking coupling to the machine-tool parting device 16. Here, the coupling device 14 may be in the form of a bayonet connection and/or some other coupling device that would appear expedient to a person skilled in the art. Furthermore, the portable machine tool 10 has a machine-tool housing 12 which encloses a drive unit 42 and a gearing unit 44 of the portable machine tool 10. The drive unit 42 and the gearing unit 44 are operatively connected to one another, in a manner already known to a person skilled in the art, in order to generate a drive torque that can be transmitted to the machine-tool parting device 16. Here, the drive unit 42 and/or the gearing unit 44 are provided so as to be coupled to a cutting strand 18 of the machine-tool parting device 16 by means of the coupling device 14 when the machine-tool parting device 16 is in a mounted state. The gearing unit 44 of the portable machine tool 10 is in the form of an angular gearing. The drive unit 42 is in the form of an electric motor unit. It is however also conceivable for the drive unit 42 and/or the gearing unit 44 to be of some other configuration that would appear expedient to a person skilled in the art. The drive unit 42 is provided for driving the cutting strand 18 of the machine-tool parting device 16 with a cutting speed of less than 6 m/s in at least one operating state. Here, the portable machine tool 10 has at least one operating mode in which it is made possible for the cutting strand 18 to be driven along a cutting direction 46 of the cutting strand 18 with a cutting speed of less than 6 m/s in a guide unit 20 of the machine-tool parting device 16.

Furthermore, the portable machine tool 10 has a support unit 22 for support on a workpiece (not illustrated in any more detail here), wherein the support unit 22 and the machine-tool housing 12 are movably mounted relative to one another. In at least one operating state, the support unit 22 is supported by way of a support surface 40 of the support unit 22 on a workpiece to be machined (not illustrated in any more detail here). The support unit 22 is in the form of a sliding shoe and/or a base plate by means of which the portable machine tool 10 slides and/or is supported on a workpiece during the machining of the workpiece. The support unit 22 comprises a bearing element 24 for the pivotable mounting of the support unit 22 on the machine-tool housing 12, which bearing element, when the support unit 22 is in a mounted state, is operatively connected to the machine-tool housing 12 on a side 26, which is remote from the coupling device 14, of the machine-tool housing 12. Overall, the support unit 22 has two bearing elements 24, 48. The bearing elements 24, 48 are in each case in the form of eyelets with a recess. When the support unit 22 is in a mounted state, the bearing elements 24, 48 extend in the direction of the machine-tool housing 12. For the pivotable mounting of the support unit 22 on the machine-tool housing 12, the machine-tool housing 12 has a journal-like connecting element 50. When the support unit 22 is in a mounted state, the journal-like connecting element 50 engages in each case into a recess of the bearing elements 24, 48 in the form of eyelets. The support unit 22 is pivotably mounted on the machine-tool housing 12 by means of an interaction of the bearing elements 24, 48 and of the journal-like connecting element 50. The machine-tool housing 12 and the support unit 22 are thus pivotably mounted relative to one another. It is however also conceivable for the support unit 22 to be pivotably mounted on the machine-tool housing 12 by means of some other bearing arrangement configuration that would appear expedient to a person skilled in the art. The support unit 22 and the machine-tool housing 12 are mounted pivotably relative to one another about a pivot axis 54, which runs at least substantially perpendicular to a drive unit longitudinal axis 52 of the drive unit 42, by means of an interaction of the bearing elements 24, 48 and the journal-like connecting element 50. When the support unit 22 is in a mounted state, the pivot axis 54 runs coaxially with respect to a longitudinal axis of the journal-like connecting element 50 of the machine-tool housing 12.

Furthermore, the support unit 22 has at least one spring element 28 which is provided for preloading the support unit 22 and the machine-tool housing 12 relative to one another. The spring element 28 is in the form of a leg spring. It is however also conceivable for the spring element 28 to be of some other configuration that would appear expedient to a person skilled in the art, such as for example a compression spring, a tension spring, a plate spring etc. When the support unit 22 is in a mounted state, the spring element 28 in the form of a leg spring is supported by way of one end against the machine-tool housing 12. Furthermore, the spring element 28 in the form of a leg spring is supported by way of a further end, which is remote from the end supported on the machine-tool housing 12, on the support unit 22. The support unit 22 and the machine-tool housing 12 have in each case one receiving element (not illustrated in any more detail here) for receiving the respective end of the spring element 28 in the form of a leg spring.

Furthermore, the support unit 22 comprises an arresting device 30 which is provided for fixing the machine-tool housing 12 in an angular position relative to the support unit 22. The arresting device 30 has a clamping element 56 which is provided such that, when the machine-tool parting device 16 is in a mounted state, said clamping element exerts on the guide unit 20 a clamping force for fixing the machine-tool housing 12 in an angular position relative to the support unit 22. The clamping force acts on the guide unit 20 in a direction at least substantially perpendicular to a cutting plane of the cutting strand 18. Thus, a movement of the guide unit 20 relative to the support unit 22 is prevented by means of the arresting device 30. Owing to the connection of the machine-tool parting device 16 and of the coupling device 12, the fixing of the guide unit 20 by the arresting device 30 furthermore prevents a movement of the machine-tool housing 12 relative to the support unit 22. The arresting device 30 is arranged on a side 32, which faces toward the machine-tool housing 12 and faces away from the support surface 40 of the support unit 22, of the support unit 22.

Furthermore, the support unit 22 has a tool guide unit 36 which is provided for aligning a longitudinal axis 38 of the machine-tool parting device 16 at least substantially perpendicular to a support surface 40 of the support unit 22 as a function of an angular position of the machine-tool housing 12 relative to the support unit 22. Here, the coupling device 14 is pivotably mounted relative to the machine-tool housing 12. Thus, the machine-tool parting device 16 can, in a state in which it is coupled to the coupling device 14, be pivoted relative to the machine-tool housing 12. The coupling device 14 is mounted pivotably about a pivot axis 138 which, when the machine-tool parting device 16 is in a mounted state, runs at least substantially perpendicular to the cutting plane of the cutting strand 18. Furthermore, the machine-tool parting device 16 can, by means of the pivotable mounting of the coupling device 14, be pivoted relative to the support unit 22. In a state in which it is arranged in the tool guide unit 36, the guide unit 20 of the machine-tool parting device 16 is guided by means of the tool guide unit 36. Thus, the guide unit 20, owing to the fact that it is guided in the tool guide unit 36, is pivoted relative to the machine-tool housing 12 by means of the pivotably mounted coupling device 14 in the event of a pivoting movement of the support unit 22 and of the machine-tool housing 12 relative to one another. Here, during the pivoting movement, by means of the guidance in the tool guide unit 36, the longitudinal axis 38 of the machine-tool parting device 16 maintains an at least substantially perpendicular orientation with respect to the support surface 40 of the support unit 22. The tool guide unit 36 and the arresting device 30 are partially formed in one piece. Here, the clamping element 56 of the arresting device 30 is formed in one piece with a guide element 58 of the tool guide unit 36. It is however also conceivable for the tool guide unit 36 and the arresting device 30 and/or the clamping element 56 and the guide element 58 to be formed separately from one another. The clamping element 56 or the guide element 58 is mounted pivotably about a pivot axis 60 which, when the machine-tool parting device 16 is in a mounted state, runs at least substantially perpendicular to the cutting plane of the cutting strand 18. The clamping element 56 or the guide element 58 has a release position, a guiding position and a clamping position. The clamping element 56 or the guide element 58 is illustrated in the clamping position in FIG. 1. In the clamping position, the guide unit 20 is fixed in a position relative to the support unit 22 by means of a clamping force exerted on the guide unit 20 by the clamping element 56 or by the guide element 58. In this way, the machine-tool housing 12 is fixed relative to the support unit 22 in an angular position desired by an operator.

In the event of a rotation of the clamping element 56 or of the guide element 58 through 90° about the pivot axis 60 in the direction of the machine-tool housing 12 proceeding from the clamping position, the clamping element 56 or the guide element 58 is transferred into the guiding position. In the guiding position, a movement capability of the guide unit 20 of the machine-tool parting device 16 is predefined relative to the support unit 22, along a direction running at least substantially perpendicular to the support surface 40 of the support unit 22, in the tool guide unit 36 or the arresting device 30. Thus, movement capabilities of the guide unit 20 along directions deviating from the direction running at least substantially perpendicular to the support surface 40 are prevented when the clamping element 56 or the guide element 58 is in the guiding position. Here, the clamping element 56 or the guide element 58 may have rib-like formations (not illustrated in any more detail here) which, when the machine-tool parting device 16 is in a mounted state and the clamping element 56 or the guide element 58 is in the guide position, engage into groove-like recesses (not illustrated in any more detail here) of the guide unit 20. It is however also conceivable for the clamping element 56 or the guide element 58 and the guide unit 20 to have some other configuration, that would appear expedient to a person skilled in the art, for the guidance of the guide unit 20.

In the event of a further rotation of the clamping element 56 or of the guide element 58 through 90° proceeding from the guiding position along the direction in which the clamping element 56 or the guide element 58 was rotated from the clamping position into the guiding position, the clamping element 56 or the guide element 58 is transferred into the release position. As a result of the rotational movement from the guiding position into the release position, the clamping element 56 or the guide element 58 is moved away from the guide unit 20. Thus, the clamping element 56 or the guide element 58, when in the release position, is not in contact with the guide unit 20. In the release position, the machine-tool parting device 16 can be removed from the tool guide unit 36 or the arresting device 30. Here, the support unit 22 has a recess 62 in the support surface 40. As viewed in a plane running at least substantially parallel to the support surface 40, the recess 62 extends from an end, which is remote from the bearing elements 24, 48, of the support unit 22 to the arresting device 30 or to the tool guide unit 36. Thus, when the clamping element 56 or the guide element 58 is in the release position, the machine-tool parting device 16 can be pivoted out of the arresting device 30 or out of the tool guide unit 36 by means of a pivoting movement of the coupling device 14 relative to the machine-tool housing 12 and/or a pivoting movement of the machine-tool housing 12 relative to the support unit 22. Furthermore, the machine-tool parting device 16, in a state in which it is coupled to the coupling device 14, extends through the recess 62 for the purpose of machining a workpiece.

By means of the pivotable mounting of the machine-tool housing 12 and the support unit 22 relative to one another, it is possible, during the machining of a workpiece, for an operator of the portable machine tool 10 to adjust a cutting depth of a cut that can be formed into a workpiece by means of the cutting strand 18. Here, the guide unit 20 is arranged in the tool guide unit 36 or in the arresting device 30, and the clamping element 56 or the guide element 58 is situated in the guiding position. Thus, the guide unit 20 can be moved in the tool guide unit 36 or in the arresting device 30, along the direction running at least substantially perpendicular to the support surface 40, until the desired cutting depth is set. After the cutting depth has been successfully set, the operator actuates the clamping element 56 or the guide element 58 and transfers the clamping element 56 or the guide element 58 into the clamping position. Here, the machine-tool housing 12 is fixed in an angular position relative to the support unit 22, and a cutting depth of the machine-tool parting device 16 is fixed. Thus, it is possible for the operator to form into a workpiece to be machined a cut which has a constant cutting depth proceeding from a surface of a workpiece to be machined.

Furthermore, when the guide unit 20 is arranged in the tool guide unit 36 or in the arresting device 30, an operator can, by means of the cutting strand 18, form plunge cuts into a workpiece to be machined. Here, the guide unit 20 is arranged in the tool guide unit 36 or in the arresting device 30 and the clamping element 56 or the guide element 58 is situated in the guiding position. By means of a pivoting movement of the machine-tool housing 12 relative to the support unit 22, and by means of a constant orientation, running at least substantially perpendicular to the support surface 40, of the longitudinal axis 38 of the machine-tool parting device 16 through the tool guide unit 36 during the pivoting movement of the machine-tool housing 12, it is possible, during the machining of a workpiece, for plunge cuts to be formed by means of the cutting strand 18 into a workpiece to be machined.

Figure 2:
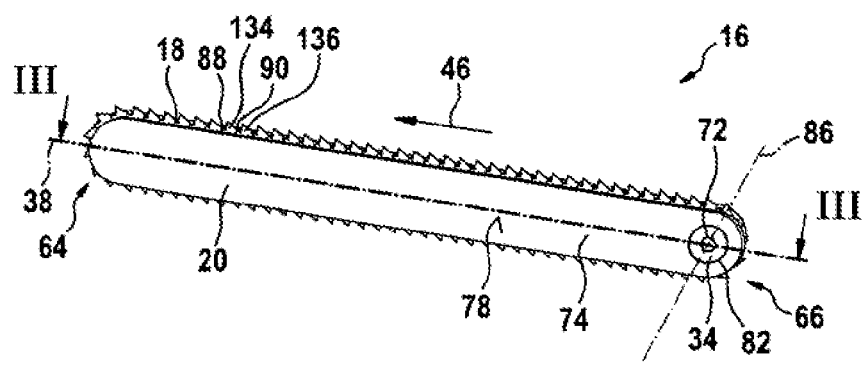
FIG. 2 shows a detail view of the machine-tool parting device according to the disclosure, in a schematic illustration.
Figure 6:
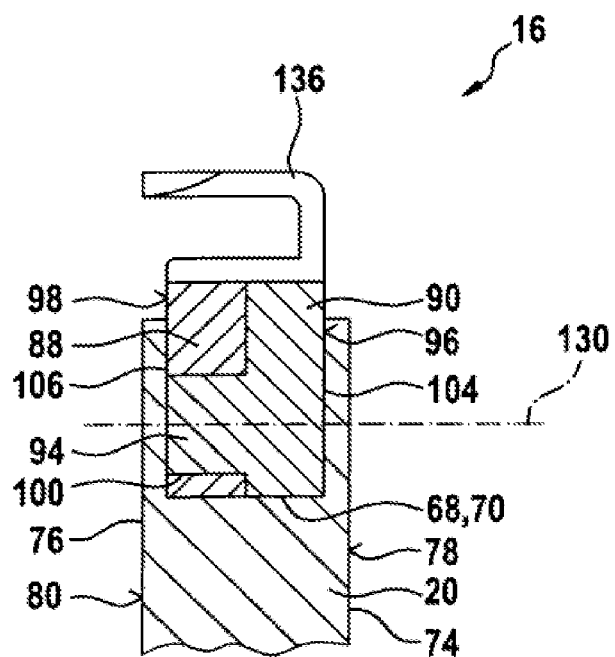
FIG. 6 shows a detail view of an arrangement of the cutter carrier elements in a guide unit of the machine-tool parting device according to the disclosure, in a schematic illustration.

FIG. 2 shows the machine-tool parting device 16 in a state in which it is decoupled from the coupling device 14 of the portable machine tool 10. The machine-tool parting device 16 has the cutting strand 18 and the guide unit 20 which, together, form a self-contained system. The guide unit 20 is in the form of a sword. Furthermore, the guide unit 20 has at least two convexly formed ends 64, 66 as viewed in the cutting plane of the cutting strand 18. The convexly formed ends 64, 66 of the guide unit 20 are arranged at two sides of the guide unit 20 which face away from one another. The cutting strand 18 is guided by means of the guide unit 20. For this purpose, the guide unit 20 has at least one guide element 68 (FIG. 6) by means of which the cutting strand 18 is guided. The guide element 68 is in this case in the form of a guide groove 70 which extends, in a cutting plane of the cutting strand 18, along a full circumference of the guide unit 20. Here, the cutting strand 18 is guided by means of edge regions, which delimit the guide groove 70, of the guide unit 20. It is however also conceivable for the guide element 68 to be formed in some other way that would appear expedient to a person skilled in the art, for example as a rib-like formation on the guide unit 20, which formation engages into a recess on the cutting strand 18. As viewed in a plane running perpendicular to the cutting plane, the cutting strand 18 is surrounded on three sides by the edge regions that delimit the guide groove 70 (FIG. 6). During operation, the cutting strand 18 is moved relative to the guide unit 20 in an encircling manner along the circumference in the guide groove 70.

Furthermore, the machine-tool parting device 16 has a torque transmission element 34, which is mounted at least partially by means of the guide unit 20, for driving the cutting strand 18. Here, the torque transmission element 34 has a coupling recess 72 which, in a mounted state, can be coupled to a drive output shaft (not illustrated in any more detail here) of the gearing unit 44. It is however also conceivable for the torque transmission element 34, in a coupled state, to be coupled directly to a pinion of the drive unit 42 and/or a gearwheel of the gearing unit 44 for the purpose of driving the cutting strand 18. The coupling recess 72 is arranged concentrically in the torque transmission element 34. The coupling recess 72 is in the form of a hexagonal socket. It is however also conceivable for the coupling recess 72 to have some other configuration that would appear expedient to a person skilled in the art.

Figure 3:
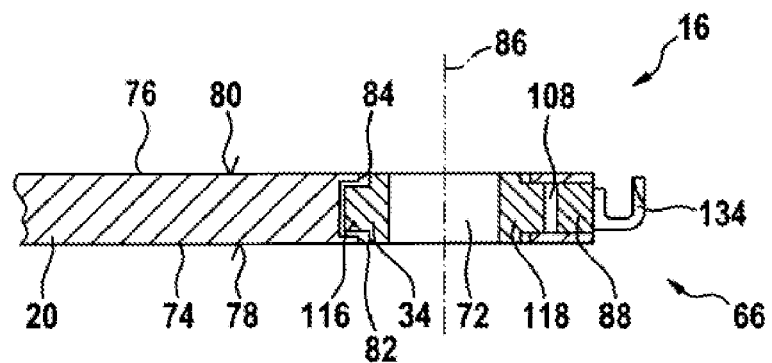
FIG. 3 shows a sectional view of the machine-tool parting device according to the disclosure along the line III-III from FIG. 2, in a schematic illustration.

In an uncoupled state, the torque transmission element 34 is arranged in the guide unit 20 so as to be movable transversely with respect to the cutting direction 46 of the cutting strand 18 and/or along the cutting direction 46 (FIG. 3). Here, the torque transmission element 34 is arranged at least partially between two outer walls 74, 76 of the guide unit 20. The outer walls 74, 76 run at least substantially parallel to the cutting plane of the cutting strand 18. In outer surfaces 78, 80 of the outer walls 74, 76, the guide unit 20 has in each case one recess 82, 84 in which the torque transmission element 34 is at least partially arranged. The torque transmission element 34 is arranged by way of a partial region in the recesses 82, 84 of the outer walls 74, 76. Here, at least in the sub-region arranged in the recesses 82, 84, the torque transmission element 34 has, along an axis of rotation 86 of the torque transmission element 34, an extent which terminates flush with one of the outer surfaces 78, 80 of the guide unit 20. Furthermore, that sub-region of the torque transmission element 34 which is arranged in the recesses 82, 84 of the outer surfaces 78, 80 of the guide unit 20 has an outer dimension, extending at least substantially perpendicular to the axis of rotation 86 of the torque transmission element 34, which is at least 0.1 mm smaller than an inner dimension, extending at least substantially perpendicular to the axis of rotation 86 of the torque transmission element 34, of the recesses 82, 84. Along a direction running perpendicular to the axis of rotation 86, that sub-region of the torque transmission element 34 which is arranged in the recesses 82, 84 is in each case spaced apart from an edge, which delimits the respective recess 82, 84, of the outer walls 74, 76. Thus, that sub-region of the torque transmission element 34 which is arranged in the recesses 82, 84 exhibits play within the recesses 82, 84.

Figure 4:
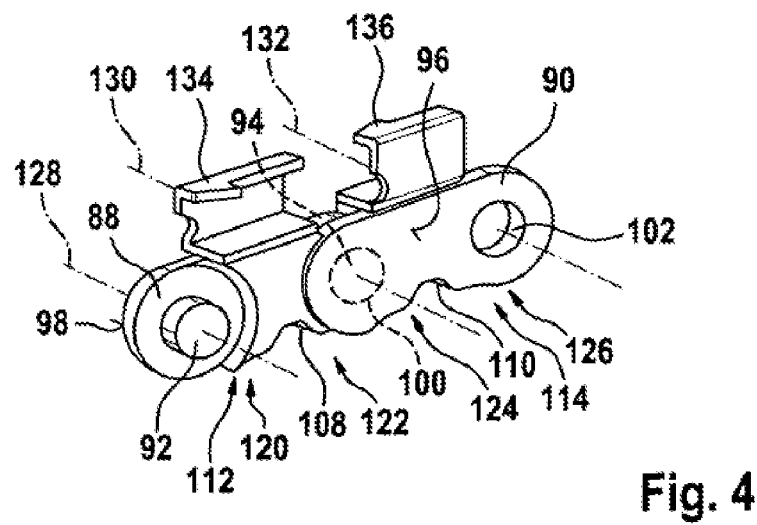
FIG. 4 shows a detail view of cutter carrier elements of a cutting strand of the machine-tool parting device according to the disclosure, in a schematic illustration.

FIG. 4 shows a detail view of cutter carrier elements 88, 90 of the cutting strand 18 of the machine-tool parting device 16. The cutting strand 18 comprises a multiplicity of interconnected cutter carrier elements 88, 90 which are connected to one another in each case by means of a connecting element 92, 94 of the cutting strand 18, said cutting element terminating at least substantially flush with one of two outer surfaces 96, 98 of one of the interconnected cutter carrier elements 88, 90 (cf. also FIG. 6). The connecting elements 92, 94 are formed in the manner of journals. When the cutting strand 18 is in a state in which it is arranged in the guide groove 70, the outer surfaces 96, 98 run at least substantially parallel to the cutting plane of the cutting strand 18. Depending on the application, a person skilled in the art will select a suitable number of cutter carrier elements 88, 90 for the cutting strand 18. The cutter carrier elements 88, 90 are in each case formed in one piece with one of the connecting elements 92, 94.

Furthermore, the cutter carrier elements 88, 90 have in each case one connecting recess 100, 102 for receiving one of the connecting elements 92, 94 of the interconnected cutter carrier elements 88, 90. The connecting elements 92, 94 are guided by means of the guide unit 20 (FIG. 6). Here, when the cutting strand 18 is in a mounted state, the connecting elements 92, 94 are arranged in the guide groove 70. The connecting elements 92, 94 may be supported, as viewed in a plane running perpendicular to the cutting plane, on two side walls 104, 106 of the guide groove 70. The side walls 104, 106 delimit the guide groove 70 along a direction running perpendicular to the cutting plane. Furthermore, as viewed in the cutting plane, the side walls 104, 106 of the guide groove 70 extend outward from the guide unit 20 perpendicular to the cutting direction 46 of the cutting strand 18.

Figure 5:
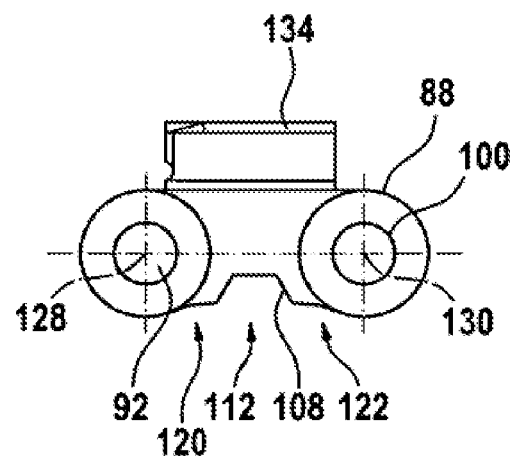
FIG. 5 shows a further detail view of one of the cutter carrier elements of the cutting strand of the machine-tool parting device according to the disclosure in a schematic illustration.

The cutter carrier elements 88, 90 of the cutting strand 18 have in each case one drive recess 108, 110 which, in each case in a mounted state, is arranged on a side 112, 114, which faces toward the torque transmission element 34, of the respective cutter carrier element 88, 90. In at least one operating state, the torque transmission element 34 engages into the drive recesses 108, 110 for the purpose of driving the cutting strand 18. The torque transmission element 34 is in this case in the form of a gearwheel. Thus, the torque transmission element 34 comprises teeth 116, 118 which are provided such that, in at least one operating state, they engage into the drive recesses 108, 110 of the cutter carrier elements 88, 90 for the purpose of driving the cutting strand 18. Furthermore, those sides 112, 114 of the cutter carrier elements 88, 90 which face toward the torque transmission element 34 are of circular-arc-shaped form. Those sides 112, 114 of the cutter carrier elements 88, 90 which face toward the torque transmission element 34 in a mounted state are of circular-arc-shaped configuration in each case in sub-regions 120, 122, 124, 126 as viewed between a central axis 128 of the respective connecting element 92, 94 and a central axis 130, 132 of the respective connecting recess 100, 102. The circular-arc-shaped sub-regions 120, 122, 124, 126 are formed in each case adjacent to the drive recesses 108, 110 into which the torque transmission element 34 engages. Here, the circular-arc-shaped sub-regions 120, 122, 124, 126 have a radius which corresponds to a radius of a profile of the guide groove 70 at the convex ends 64, 66. The sub-regions 120, 122, 124, 126 are of concave form (FIG. 5).

Furthermore, the cutting strand 18 has cutting elements 134, 136. The cutting elements 134, 136 are in each case formed in one piece with one of the cutter carrier elements 88, 90. A number of the cutting elements 134, 136 is dependent on a number of cutter carrier elements 88, 90. A person skilled in the art will select a suitable number of cutting elements 134, 136 depending on the number of cutter carrier elements 88, 90. The cutting elements 134, 136 are provided for permitting a parting-off and/or removal of material particles of a workpiece to be machined (not illustrated in any more detail here). The cutting elements 134, 136 may for example be formed as full-chisel, half-chisel or other cutter types that would appear expedient to a person skilled in the art, and which are intended for permitting a parting-off and/or removal of material particles of a workpiece to be machined. The cutting strand 18 is of endless form. Thus, the cutting strand 18 is in the form of a cutting chain. The cutter carrier elements 88, 90 are in this case formed as chain links which are connected to one another by means of the journal-like connecting elements 92, 94. It is however also conceivable for the cutting strand 18, the cutter carrier elements 88, 90 and/or the connecting elements 92, 94 to be configured in some other way that would appear expedient to a person skilled in the art.

The invention claimed is:

1. A machine-tool system comprising:
   a machine-tool parting device including at least one cutting strand and a guide unit configured to guide the at least one cutting strand, the at least one cutting strand and the guide unit together defining a self-contained system; and
   a portable machine tool including a machine-tool housing, at least one coupling device configured to couple to the machine-tool parting device, and a support unit having a support surface configured to be supported on a workpiece, the machine-tool parting device extending through a support surface plane of the support surface,
   wherein the support unit and the machine-tool housing are mounted so as to be pivotable relative to one another so as to adjust a distance by which the machine-tool parting device extends beyond the support surface in a direction opposite the machine-tool housing,
   wherein the support unit includes an arresting device configured to exert a clamping force on the guide unit in a mounted state of the machine-tool parting device so as to fix the machine-tool housing at a fixed angular position relative to the support unit, and
   wherein the support unit includes at least one tool guide unit configured to align the machine-tool parting device relative to the support unit independently of an angular position of the machine-tool housing relative to the support unit such that a longitudinal axis of the machine-tool parting device remains at least substantially perpendicular to the support surface of the support unit at various angular positions of the machine-tool housing relative to the support unit.

2. The machine-tool system as claimed in claim 1, wherein:
   the support unit includes at least one bearing element configured to pivotably mount the support unit relative to the machine-tool housing, and
   the bearing element is operatively connected to a first end region of the machine-tool housing and the coupling device is located at a second opposite end region of the machine-tool housing.

3. The machine-tool system as claimed in claim 1, wherein the support unit includes at least one spring element configured to preload the support unit and the machine-tool housing relative to one another.

4. The machine-tool system as claimed in claim 1, wherein the arresting device is arranged on a side of the support unit facing toward the machine-tool housing.

5. The machine-tool system as claimed in claim 1, wherein the at least one coupling device is mounted pivotably relative to the machine-tool housing.

6. The machine-tool system as claimed in claim 1, wherein the self-contained system of the at least one cutting strand and the guide unit is formed such that the at least one cutting strand and the guide unit are connected to one another at least substantially non-detachably.

7. The machine-tool system as claimed in claim 1, wherein the machine-tool parting device includes a torque transmission element mounted at least partially in the guide unit, and the torque transmission element is configured to transmit torque from a drive unit of the portable machine tool to the at least one cutting strand.

8. The machine-tool system as claimed in claim 7, wherein the torque transmission element defines a coupling recess configured to transmit torque from a drive unit of the portable machine tool to the at least one cutting strand.

9. The machine-tool system as claimed in claim 7, wherein the at least one cutting strand includes a plurality of carrier elements, each of which includes a cutting element and a drive recess, and the torque transmission element is configured to engage the drive recess of each of the plurality of carrier elements in sequence to transmit the torque to the at least one cutting strand.

10. The machine-tool system as claimed in claim 1, wherein the portable machine tool includes a drive unit defining a drive unit axis, and the drive unit axis is in a first plane that is parallel to a second plane defined by the guide unit.

11. The machine-tool system as claimed in claim 1, wherein the support unit and the machine-tool housing are pivotable relative to one another about a pivot axis, which is spaced apart from the machine-tool parting device.

12. A portable machine tool for a machine-tool system having at least one machine-tool parting device including at least one cutting strand and at least one guide unit configured to guide the at least one cutting strand, the at least one cutting strand and the at least one guide unit together defining a self-contained system, the portable machine tool comprising:
   a machine-tool housing;
   a coupling device configured to couple to the machine-tool parting device; and
   a support unit having a support surface configured to be supported on a workpiece, the machine-tool parting device extending through a support surface plane of the support surface,
   wherein the support unit and the machine-tool housing are mounted pivotably relative to one another so as to adjust a distance by which the machine-tool parting device extends beyond the support surface in a direction opposite the machine-tool housing,
   wherein the support unit includes an arresting device configured to exert a clamping force on the guide unit in a mounted state of the machine-tool parting device so as to fix the machine-tool housing at a fixed angular position relative to the support unit, and
   wherein the support unit includes at least one tool guide unit configured to align the machine-tool parting device relative to the support unit independently of an angular position of the machine-tool housing relative to the support unit such that a longitudinal axis of the machine-tool parting device remains at least substantially perpendicular to the support surface of the support unit at various angular positions of the machine-tool housing relative to the support unit.

* * * * *